Aug. 29, 1933.     R. S. VAN METER     1,924,424
FISHING TOOL FOR WELLS
Filed July 15, 1932
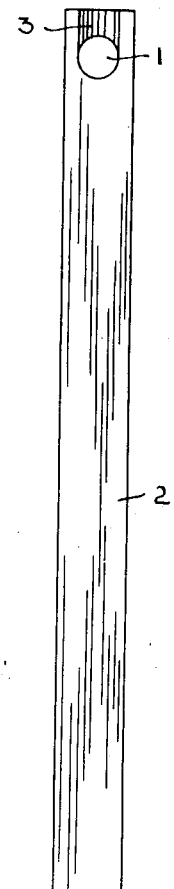
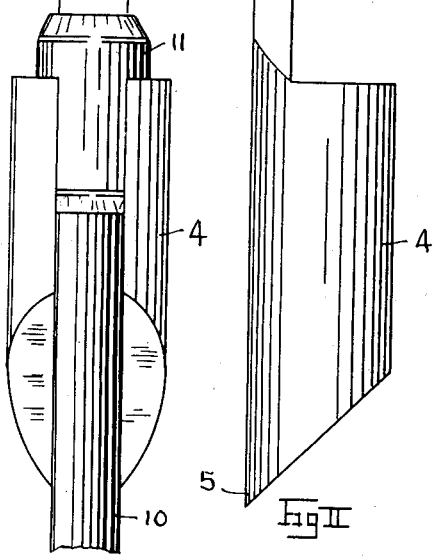
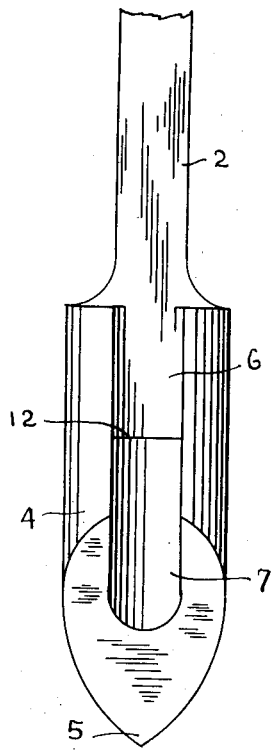
Fig.III.
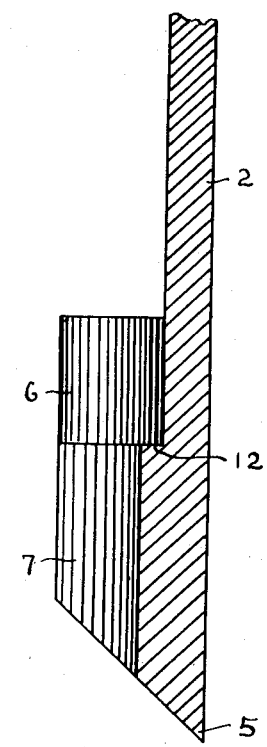
Fig.IV.
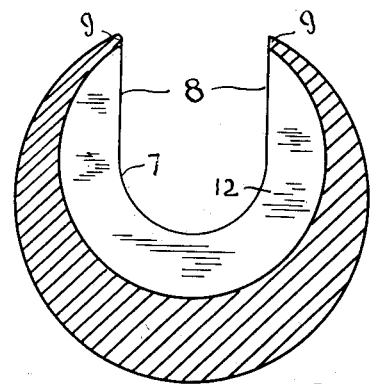
Fig.V.
Fig.VI
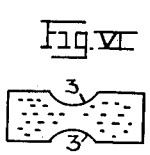
Fig.I
Fig.II
INVENTOR
Ray S. Van Meter,

UNITED STATES PATENT OFFICE 1,924,424

FISHING TOOL FOR WELLS

Ray S. Van Meter, Malin, Oreg.

Application July 15, 1932. Serial No. 622,705

2 Claims. (Cl. 294—86)

My invention relates to improvements in fishing tools and the object of my improvement is to provide a sturdy, inexpensive tool that will make dependable contact with lost pipe in a well, grip it securely, and stand the heavy strain of drawing it out. A further object is to provide a tool that will grip the sleeve of the second, or still lower joints of pipe if the first should give way.

In the drawing:

Figure I is a front view of the tool gripping a sleeve at the top of a pipe,

Fig. II is a side view of the fishing tool,

Fig. III is a front view of the tool,

Fig. IV is a vertical section,

Fig. V is a cross section, and

Fig. VI is an end view of the shank of the tool.

The fishing tool contains an eye 1 at the end of shank 2. From the eye to the end of the shank on both sides are provided grooves 3 to accommodate the loop or link by means of which it is suspended.

The head 4 of the tool is forged as a part of the same piece of metal which forms the shank 2, and comes to a point 5 at the lower end. The head is longitudinally bored to form a tube larger in bore in the upper part 6 than in the lower 7; the bore of the upper part is of sufficient diameter to accommodate the sleeve 11 of the lost pipe and that of the lower part of a diameter sufficient to admit the pipe 10 only. This tube 6, 7 is not closed, however, but contains a frontal slot 8 about equal in width to the diameter of the pipe 10.

The shank 2 and the back of the head 4 are relatively thick, and the lips 9 of the slotted tube are relatively thin so that the tool will naturally hang in a vertical position and swing directly under the sleeve to be engaged.

In operation, the fishing tool is lowered into the well by a cable until the lost pipe is encountered. The point 5 of the tool slips in between the sleeve 11 and the well casing. After squeezing past the sleeve the slot 8 engages the pipe 10. The cable is then drawn up; sleeve 11 enters the top part 6 of the tube, and since the slot 8 is less than its diameter, it cannot slip out. The lost pipe, caught by the shoulder 12, is then pulled from the well. Should the sleeve 11 give way under the strain, the tool may be lowered to engage other couplings deeper in the well.

I claim:

1. A fishing tool having a shank, an eye in said shank, and a head, said head terminating at the lower end in a point, and having a longitudinal tube larger in bore in the upper than in the lower portion and having also a frontal slot of a width about equal to the diameter of the lower portion of the tube.

2. A fishing tool consisting of a single piece of metal comprising a shank, an eye in said shank, and a head, said head terminating in a point at the bottom, and provided with a longitudinal tube having a shoulder within it for catching a pipe coupling, and a frontal slot for admitting the shank of a pipe.

RAY S. VAN METER.